(12) United States Patent
Machida et al.

(10) Patent No.: US 12,718,818 B2
(45) Date of Patent: Aug. 25, 2026

(54) INFORMATION PROCESSING DEVICE, INFORMATION PROCESSING METHOD, AND PROGRAM

(71) Applicant: NTT TechnoCross Corporation, Tokyo (JP)

(72) Inventors: Kenichi Machida, Tokyo (JP); Kazuhira Matsui, Tokyo (JP); Asato Tanaka, Tokyo (JP)

(73) Assignee: NTT TechnoCross Corporation, Tokyo (JP)

( * ) Notice: Subject to any disclaimer, the term of this patent is extended or adjusted under 35 U.S.C. 154(b) by 129 days.

(21) Appl. No.: 18/832,140

(22) PCT Filed: Jan. 25, 2022

(86) PCT No.: PCT/JP2022/002736

§ 371 (c)(1),
(2) Date: Jul. 23, 2024

(87) PCT Pub. No.: WO2023/144896

PCT Pub. Date: Aug. 3, 2023

(65) Prior Publication Data

US 2025/0104710 A1 Mar. 27, 2025

(51) Int. Cl.

| | |
|---|---|
| ***G10L 15/22*** | (2006.01) |
| ***G10L 15/26*** | (2006.01) |
| ***G10L 21/10*** | (2013.01) |

(52) U.S. Cl.

CPC .............. *G10L 15/22* (2013.01); *G10L 15/26* (2013.01); *G10L 21/10* (2013.01); *G10L 2015/223* (2013.01)

(58) Field of Classification Search

CPC ......... G10L 15/22; G10L 15/26; G10L 21/10; G10L 2015/223; G06F 16/00; G06F 16/90; G06F 16/332

See application file for complete search history.

(56) References Cited

U.S. PATENT DOCUMENTS

2016/0335693 A1 11/2016 Lin et al.
2021/0065685 A1* 3/2021 Hwang ................. G10L 15/075

(Continued)

FOREIGN PATENT DOCUMENTS

| | | |
|---|---|---|
| JP | 2007334429 A | 12/2007 |
| JP | 2018128869 A | 8/2018 |
| WO | 2015162719 A1 | 10/2015 |

OTHER PUBLICATIONS

Japanese Patent Application No. 2023-576296, Office Action mailed Jul. 29, 2025.

(Continued)

*Primary Examiner* — Mark Villena

(57) ABSTRACT

An information processing device according to an embodiment includes: a detection part configured to detect a character sequence from text that represents content of talk by a plurality of parties including a first speaker and a second speaker; and a presenting part configured to present, based on the detected character sequence, a display component to the second speaker, the display component being operable to cause knowledge that represents answer information to an inquiry from the first speaker to be searched for by using the character sequence as a search keyword.

13 Claims, 6 Drawing Sheets

(56) References Cited

U.S. PATENT DOCUMENTS

| | | | | |
|---|---|---|---|---|
| 2021/0397311 | A1* | 12/2021 | Soini | H04M 3/5183 |
| 2022/0254336 | A1* | 8/2022 | Lorphelin | G06Q 10/00 |
| 2023/0074406 | A1* | 3/2023 | Baeuml | G06F 16/90332 |
| 2023/0121148 | A1* | 4/2023 | Akahori | G10L 15/22<br>704/275 |

OTHER PUBLICATIONS

NTT-TX (2020) "Foresight Voice Mining > Overview, Better Contact Center Service Starts Here: Foresight Voice Mining helps you increase sales, enhance the customer experience, and ensure compliance by augmenting the performance of your contact center staff." [online] website: https://www.ntt-tx.co.jp/whatsnew/2020/200519.html, Corresponding to English Documents, website: https://www.ntt-tx.com/products/foresight_vm/.

NTT (2016) "ForeSight Voice Mining: Solving Call Center Issues Using AI: Installing the Voice Recognition Technology and Emotion Analysis Technology Developed by NTT Laboratories," NTT Technical Journal, vol. 28, No. 2, 4 pages.

Kawamura et al. (2016) "Utilizing AI in Call Centers", published by NTT Technical Journal, pp. 35-37.

* cited by examiner

| KNOWLEDGE ID | KEYWORD | TALK CONDITION | KNOWLEDGE DETAIL INFORMATION | … |
| --- | --- | --- | --- | --- |
| a-1 | PRODUCT ABC | OPERATOR | … | … |
| a-2 | PRODUCT ABC | CUSTOMER | … | … |
| a-3 | PRODUCT ABC | BOTH | … | … |
| b-1 | ARTICLES OF ASSOCIATION | OPERATOR | … | … |
| b-2 | ARTICLES OF ASSOCIATION | CUSTOMER | … | … |
| b-3 | ARTICLES OF ASSOCIATION | BOTH | … | … |
| … | … | … | … | … |

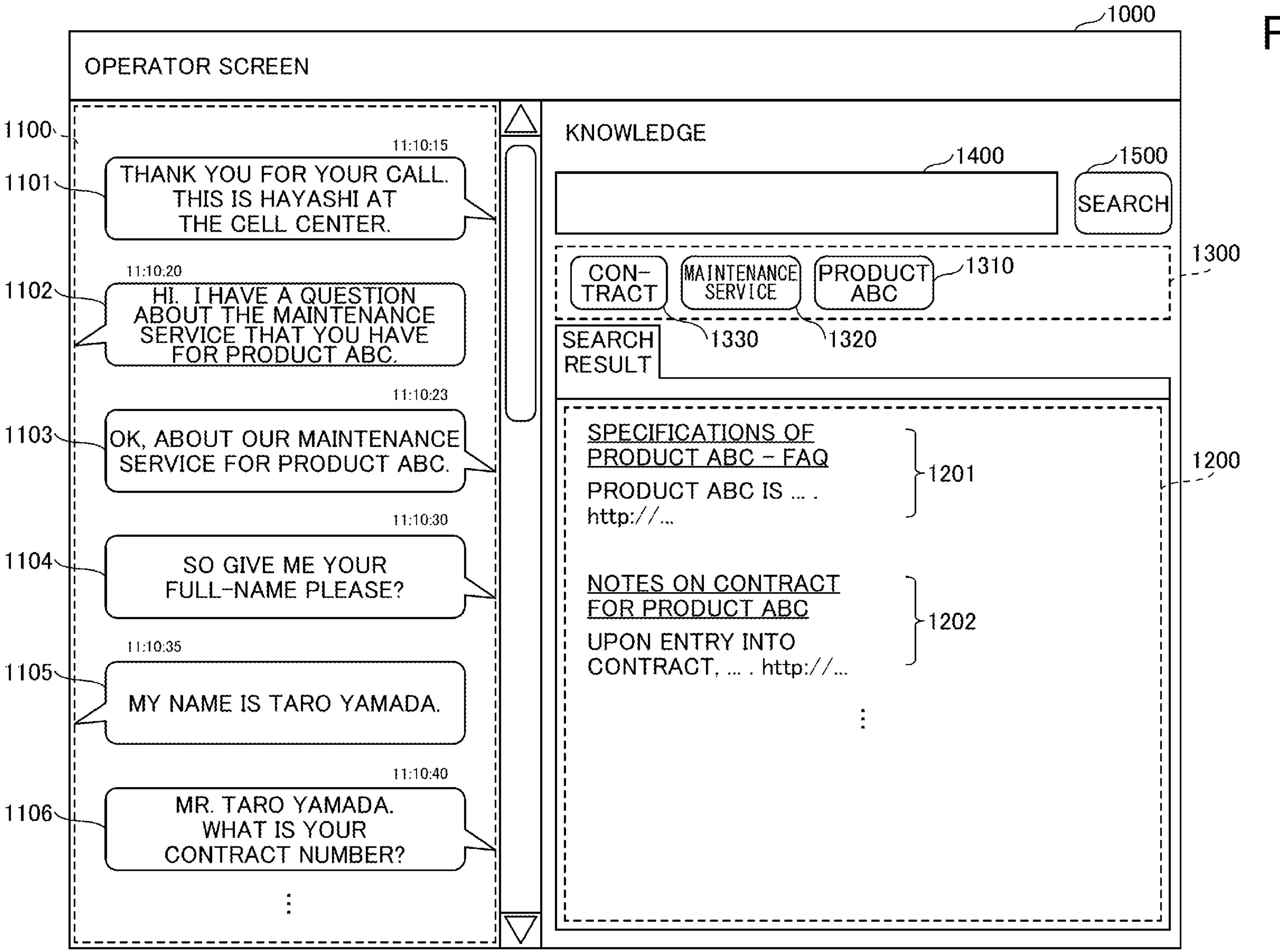
FIG.5
1000
OPERATOR SCREEN
1100
11:10:15
THANK YOU FOR YOUR CALL. THIS IS HAYASHI AT THE CELL CENTER.
1101
11:10:20
HI. I HAVE A QUESTION ABOUT THE MAINTENANCE SERVICE THAT YOU HAVE FOR PRODUCT ABC.
1102
11:10:23
OK, ABOUT OUR MAINTENANCE SERVICE FOR PRODUCT ABC.
1103
11:10:30
SO GIVE ME YOUR FULL-NAME PLEASE?
1104
11:10:35
MY NAME IS TARO YAMADA.
1105
11:10:40
MR. TARO YAMADA. WHAT IS YOUR CONTRACT NUMBER?
1106
⋮
KNOWLEDGE
1400
1500
SEARCH
1300
CON-TRACT
MAINTENANCE SERVICE
PRODUCT ABC
1310
1330
1320
SEARCH RESULT
1200
SPECIFICATIONS OF PRODUCT ABC - FAQ
PRODUCT ABC IS ... .
http://...
1201
NOTES ON CONTRACT FOR PRODUCT ABC
UPON ENTRY INTO CONTRACT, ... . http://...
1202
⋮

START

RECEIVE ANALYSIS REQUEST — S201

ANALYZE KNOWLEDGE HISTORY DB ACCORDING TO ANALYSIS REQUEST — S202

RETURN RESULT OF ANALYSIS — S203

END

INFORMATION PROCESSING DEVICE, INFORMATION PROCESSING METHOD, AND PROGRAM

CROSS-REFERENCE TO RELATED APPLICATIONS

This application is a U.S. 371 Application of International Patent Application No. PCT/JP2022/002736, filed on 25 Jan. 2022, the disclosure of which is hereby incorporated herein by reference in its entirety.

TECHNICAL FIELD

The present invention relates to an information processing device, an information processing method, and a program.

BACKGROUND ART

Analysis systems for contact centers (also referred to as "call centers") have been known heretofore (see, for example, non-patent document 1) and introduced in many contact centers for the purpose of assisting operators' work, improving the efficiency of work, improving customer satisfaction, and so forth.

Now, although operators at contact centers respond to various inquiries about products and services on a daily basis, depending on what the inquiries are about, the operators have to search FAQs (Frequently Asked Questions) and the like to find information that is necessary to provide answers, information (hereinafter also referred to as "knowledge") that helps provide answers, and so forth. There have been many technologies that apply speech recognition to operators' talk and automatically search for and present knowledge based on results of speech recognition.

CITATION LIST

Non-Patent Document

Non-Patent Document 1: "Japan Post Bank decides to introduce business support AI solution to call centers—Highly accurate speech recognition helps improve the efficiency of operator response and management operations", Internet <URL: https://www.ntt-tx.co.jp/whats-new/2020/200519.html>

SUMMARY OF INVENTION

Technical Problem

However, with conventional technologies, there are cases in which appropriate knowledge cannot be presented to operators. For example, while an operator is reading some knowledge, another knowledge search may be started automatically and end up presenting unnecessary knowledge to the operator. Also, for example, a case might occur in which an operator's manual knowledge search and an automatic knowledge search in response to a speech recognition result conflict with each other. In this case, too, unnecessary knowledge may be presented to the operator.

An embodiment of the present invention has been made in view of the foregoing, and therefore its purpose is to help present appropriate knowledge.

Solution to Problem

In order to achieve the above purpose, an information processing device according to one embodiment includes: a detection part configured to detect a character sequence from text that represents content of talk by a plurality of parties including a first speaker and a second speaker; and a presenting part configured to present, based on the detected character sequence, a display component to the second speaker, the display component being operable to cause knowledge that represents answer information to an inquiry from the first speaker to be searched for by using the character sequence as a search keyword.

Advantageous Effects of Invention

According to the present invention, it is possible to help present appropriate knowledge.

BRIEF DESCRIPTION OF DRAWINGS

FIG. 3 is a diagram that illustrates an example of a knowledge DB;

FIG. 5 is a diagram that illustrates an example of an operator screen;

DESCRIPTION OF EMBODIMENTS

One embodiment of the present invention will be described below. With the present embodiment, a contact center system 1 that is designed for contact centers and that can help present appropriate knowledge to contact center operators will be described. However, a contact center is simply one example, and, besides a contact center, for example, the present invention may be used to help present knowledge to sales representatives for products and services, counter staff at stores, and so forth, while they are engaged in sales operations and counter operations. More generally, the present invention may be applied likewise to the case where a number of parties are having a conversation, to help present knowledge to a certain party among them (which may be one party or two or more parties).

In addition, although a case will be described in the following description in which contact center operators perform their duties such as answering customer inquiries through voice calls, this is by no means limiting, and the present invention may be applied likewise to, for example, cases in which contact center operators perform their duties via text chat (which may involve sending and receiving stamps, attachment files, and so forth, besides text), video calls, and so forth.

Note that, as mentioned earlier, "knowledge" as used herein refers to information that is necessary to answer certain inquiries, or information that helps answering such inquiries. Typically, for example, information that can be obtained by searching FAQs is "knowledge." In addition to this, information that can be obtained from manuals and web pages may be "knowledge" as well.

Recent years have seen fast growth of online businesses and an increase of contact center operations, accompanied by a growth in the variety of inquiries received and the kinds of answers that the operators have to provide. Given the circumstances, introducing the contact center system 1 according to the present embodiment and helping present appropriate knowledge to operators might bring about advantages such as reducing the burden of work on operators, improving customer satisfaction, and so forth.

<Overall Structure of Contact Center System 1>

Figure 1:
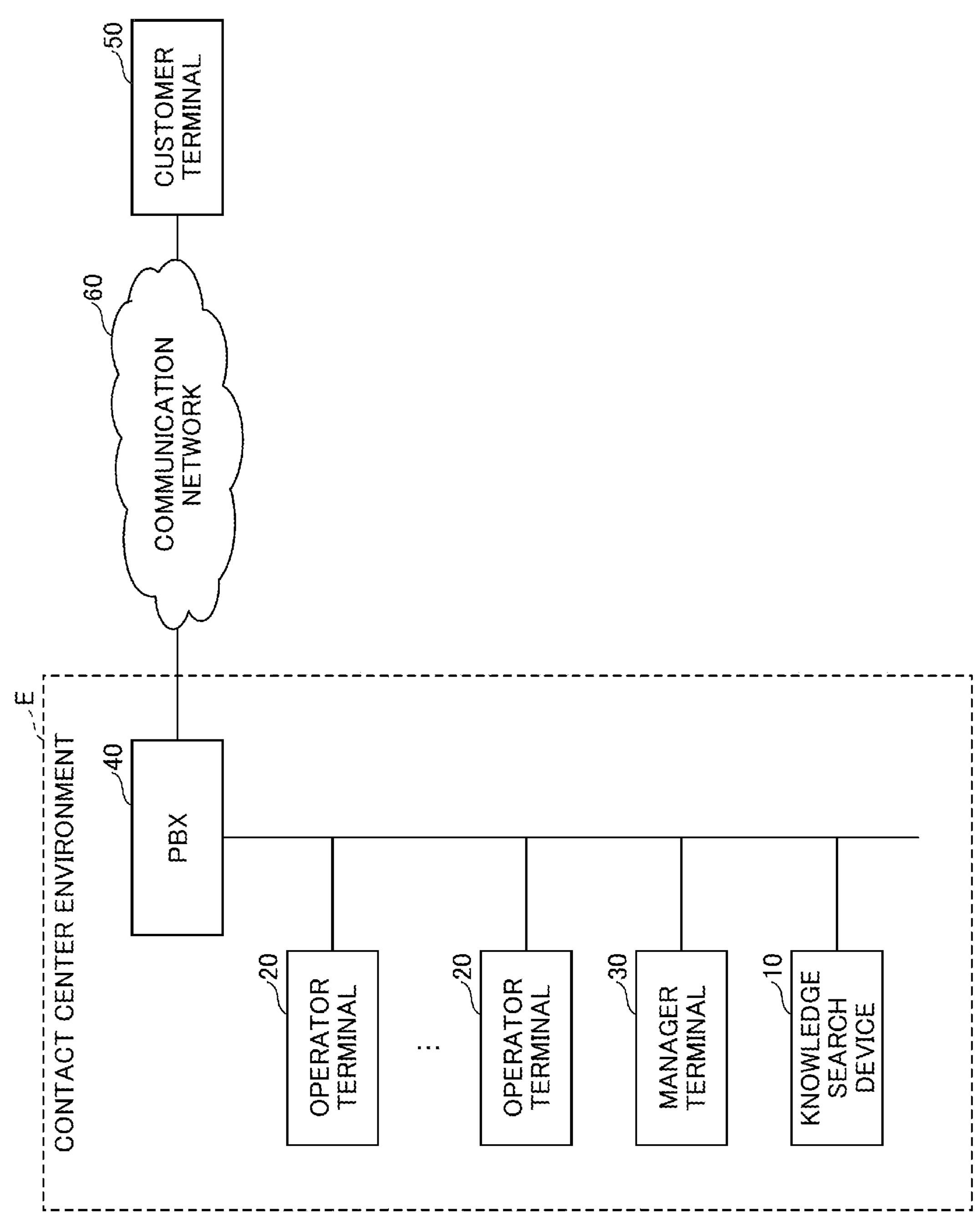
FIG. 1 is a diagram that illustrates an example overall structure of a contact center system according to an embodiment of the present invention.

FIG. 1 shows an example overall structure of the contact center system 1 according to the present embodiment. As shown in FIG. 1, the contact center system 1 according to the present embodiment includes a knowledge search device 10, an operator terminal 20, a manager terminal 30, a private branch exchange (PBX) 40, and a customer terminal 50. Here, the knowledge search device 10, operator terminal 20, manager terminal 30, and PBX 40 are provided inside a contact center environment E, which is the contact center's system environment. Note that the contact center environment E is by no means confined within the same building, and may be a system environment spanning a number of buildings that are geographically apart.

The knowledge search device 10 converts a voice call between a customer and an operator into text by using speech recognition, detects a keyword for searching for knowledge from this text, and sends information including the detected keyword (hereinafter also referred to as "knowledge information") to the operator terminal 20. When the operator chooses the knowledge information on the operator terminal 20, the knowledge search device 10 searches for information (hereinafter referred to as "knowledge detail information") related to knowledge that corresponds to the keyword included in that knowledge information, and sends the obtained knowledge detail information to the operator terminal 20. As a result of this, the knowledge is displayed on the operator terminal 20.

Furthermore, the knowledge search device 10 manages history regarding what keywords have been detected, what knowledge detail information has been used for a search, and so forth (hereinafter also referred to as "knowledge history information"), and analyzes the history when there is a request from the manager terminal 30. This allows the user of the manager terminal 30 (that is, the manager to manage the operators) to know, for example, what kind of knowledge information and knowledge detail information is useful (or not useful).

The operator terminal 20 may be a variety of terminals, such as a personal computer (PC), that an operator who answers customer inquiries can use, and that functions as an Internet protocol (IP) telephone machine. Furthermore, when an operator answers an inquiry from a customer, the operator terminal 20 displays the content of the conversation the operator has with the customer, displays knowledge search buttons, which are displayed elements that correspond to respective knowledge information, and displays knowledge detail information.

The manager terminal 30 may be a variety of terminals that the manager to manage the operators can use (hereinafter a manager like this may also be referred to as a "supervisor"), such as a PC.

The PBX 40 is a telephone exchange (IP-PBX) and is connected to a communication network 60 such as a voice over Internet protocol (VOIP) network and a public switched telephone network (PSTN). When a call arrives from a customer terminal 50, the PBX 40 calls up one or more predetermined operator terminals 20 and connects the customer terminal 50 with one operator terminal 20 that answers the call.

The customer terminal 50 may be a variety of terminals that a customer can use, such as a smartphone, a mobile phone, a fixed-line telephone, and so forth.

Note that the overall structure of the contact center system 1 shown in FIG. 1 is an example, and other structures may be applicable as well. For example, although the knowledge search device 10 is included in the contact center environment E (in other words, the knowledge search device 10 is an on-premises type) in the example shown in FIG. 1, all or part of the functions of the knowledge search device 10 may be implemented by a cloud service or the like. Similarly, although the PBX 40 is an on-premises telephone exchange in the example shown in FIG. 1, it may be implemented by a cloud service as well. Furthermore, although the operator terminal 20 is assumed to function as an IP telephone machine, for example, apart from the operator terminal 20, a telephone machine may be included in the contact center system 1.

<Functional Structure of Knowledge Search Device 10>

Figure 2:
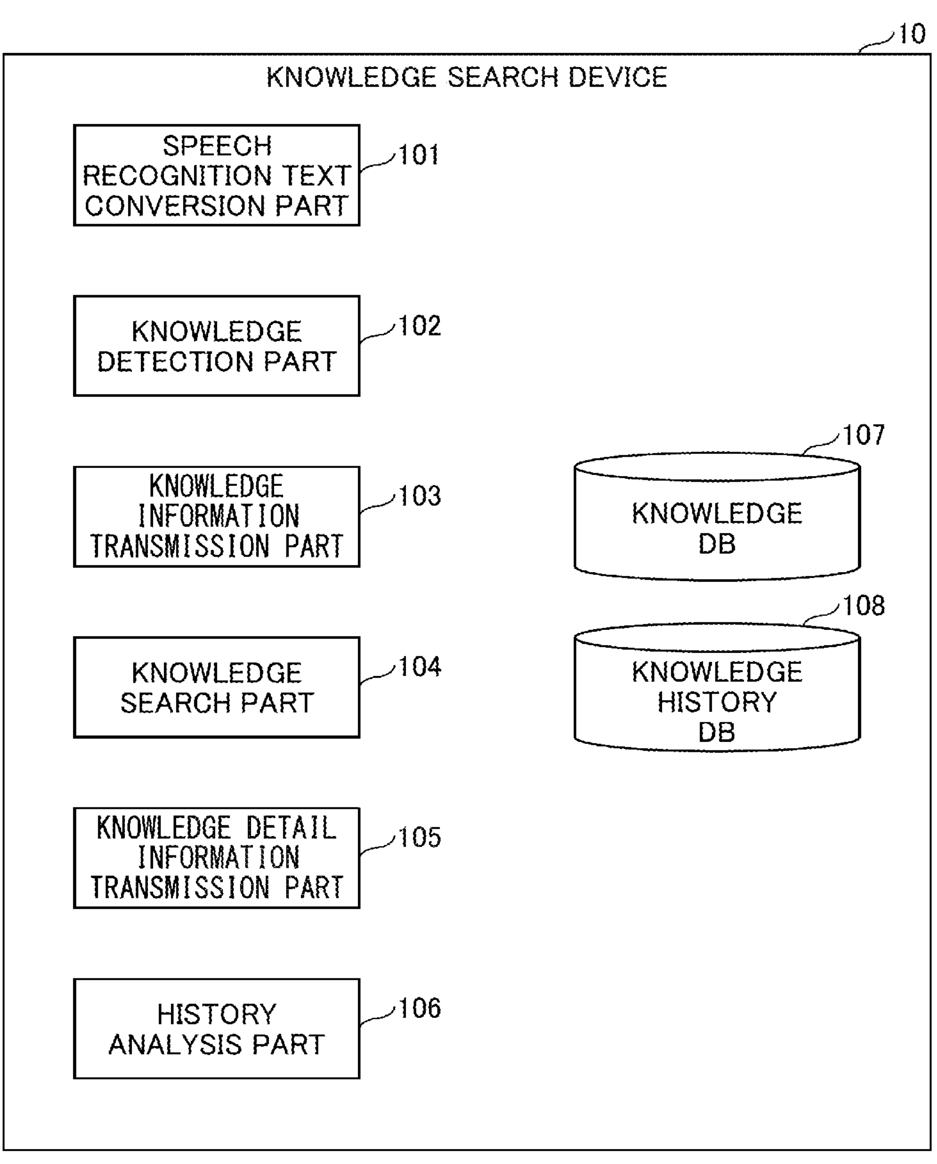
FIG. 2 is a diagram that illustrates an example functional structure of a knowledge search device according to the embodiment.

FIG. 2 illustrates an example functional structure of the knowledge search device 10 according to the present embodiment. As shown in FIG. 2, the knowledge search device 10 according to the present embodiment includes a speech recognition text conversion part 101, a knowledge detection part 102, a knowledge information transmission part 103, a knowledge search part 104, a knowledge detail information transmission part 105, and a history analysis part 106. These parts are implemented, for example, by one or more programs that are installed in the knowledge search device 10 and cause a processor such as a central processing unit (CPU) to execute processes.

Furthermore, the knowledge search device 10 according to the present embodiment includes a knowledge DB 107 and a knowledge history DB 108. Each DB (database) is implemented by, for example, a secondary storage device such as a hard disk drive (HDD) or a solid state drive (SSD). Note that at least one of these DBs may be implemented by, for example, a database server or the like connected to the knowledge search device 10 via a communication network.

The speech recognition text conversion part 101 converts a voice call between the operator terminal 20 and the customer terminal 50 into text by using speech recognition. In this case, the speech recognition text conversion part 101 applies speech recognition to each speaker and converts his/her speech into text. By this means, the operator's voice and the customer's voice are both converted into text.

Note that this application of speech recognition is repeated while a voice call is progress between the operator terminal 20 and the customer terminal 50 (for example, applied every few seconds or every word or phrase spoken by the customer or the operator).

The knowledge detection part 102 looks up the knowledge DB 107 and detects a keyword from the text converted by the speech recognition text conversion part 101. Here, the knowledge DB 107 is a database that stores, for example, information for detecting keywords and knowledge detail information that correspond to these keywords. Note that the knowledge DB 107 will be described later in detail.

The knowledge information transmission part 103 transmits knowledge information, including the keyword detected by the knowledge detection part 102, to the operator terminal 20. As a result of this, a knowledge search button that is associated with the knowledge information is displayed on the operator terminal 20.

When the operator the chooses knowledge information on the operator terminal 20, the knowledge search part 104 searches the knowledge DB 107 for knowledge detail information that corresponds to the keyword included in the knowledge information.

The knowledge detail information transmission part 105 transmits the knowledge detail information obtained by the knowledge search part 104, to the operator terminal 20.

The history analysis part 106 analyzes the knowledge history stored in the knowledge history DB 108 in response to a request from the manager terminal 30. Here, the knowledge history information stored in the knowledge history DB 108 may be, for example, information (data or records) in which, for each call, an operator ID that identifies the operator in the call, a customer ID that identifies the customer in the call, keywords detected by the knowledge detection part 102 during the call, the number of times each keyword was detected during the call (hereinafter also referred to as "the number of detections"), and the number of times the knowledge search part 104 searched for knowledge detail information corresponding to each keyword during the call (hereinafter also referred to as "the number of searches") are associated with one another.

<<Knowledge DB 107>>

Now, FIG. 3 illustrates an example of the knowledge DB 107. As shown in FIG. 3, the knowledge DB 107 stores information (data or records), in which knowledge IDs, keywords, talk conditions, and knowledge detail information are associated with one another.

A knowledge ID is information that specifies data or a record stored in the knowledge DB 107. A keyword is a character sequence that is subject to detection by the knowledge detection part 102. A talk condition is a condition that is applied when the knowledge detection part 102 detects a keyword. The knowledge detail information refers to information that represents knowledge itself or a link to that information. To be more specific, the knowledge detail information is, for example, content such as a character sequence or an image that represents knowledge, or a link to that content. In the following description, for ease of description, it is assumed that the knowledge detail information is a link to content that represents knowledge.

For example, in the information in the first line of the knowledge DB 107 shown in FIG. 3, the keyword is "product ABC" and the talk condition is "operator." This means that, if there is a character sequence that reads "product ABC" in the text representing the operator's talk, this character sequence will be detected by the knowledge detection part 102.

Similarly, in the information in the second line of the knowledge DB 107 shown in FIG. 3, the keyword is "product ABC" and the talk condition is "customer." This means that, if there is a character sequence that reads "product ABC" in the text representing the customer's talk, this character sequence will be detected by the knowledge detection part 102.

In the information in the third line of the knowledge DB 107 shown in FIG. 3, the keyword is "product ABC" and the talk condition is "both." This means that, if there is a character sequence that reads "product ABC" in both the text representing the operator's talk and the text representing the customer's talk, this character sequence will be detected by the knowledge detection part 102.

Note that the knowledge DB 107 shown in FIG. 3 is an example, and various information may be associated therein in a variety of ways.

For example, in the example shown in FIG. 3, character sequences that are subject to detection are set as is as keywords, but this is by no means limiting, and, for example, character sequences that are subject to detection may be set forth by using their proper expressions. To give a specific example, if a product ABC has related products such as a "product ABD" and a "product ABE," the metacharacter ".", which can represent any single character, may be used, and the character sequence to be detected in this case may be expressed as "product AB.".

Furthermore, for example, if there is some relationship between a certain keyword and another keyword, information to represent that relationship may be provided. To give a specific example, for example, if product ABC has a function "a" and a function "b," information that presents that the keyword "product ABC," the keyword "function a," and the keyword "function b" are related may be included. Furthermore, in this case, the relationship may be represented by a graph model, a layers model, and the like, and represented such that product ABC is the parent and the functions a and b are its children.

Furthermore, although the talk condition is the only condition for detection in the example shown in FIG. 3, there may be other detection conditions as well. For example, "call reason" may be used as a detection condition. Call reason is the reason a customer makes a telephone call to the call center (in other words, the reason for an incoming call), and corresponds to the content of the customer's inquiry. A single call may have multiple call reasons (for example, a customer may make a telephone call to the call center for two reasons: change of address and change of contract plan). By using call reason as a detection condition, for example, it becomes possible to set detection conditions such that a character sequence that is subject to detection is detected only when a certain call reason is met. Note that the call reason can be specified from the text produced by the speech recognition text conversion part 101.

<Knowledge Search Process>

Figure 4:
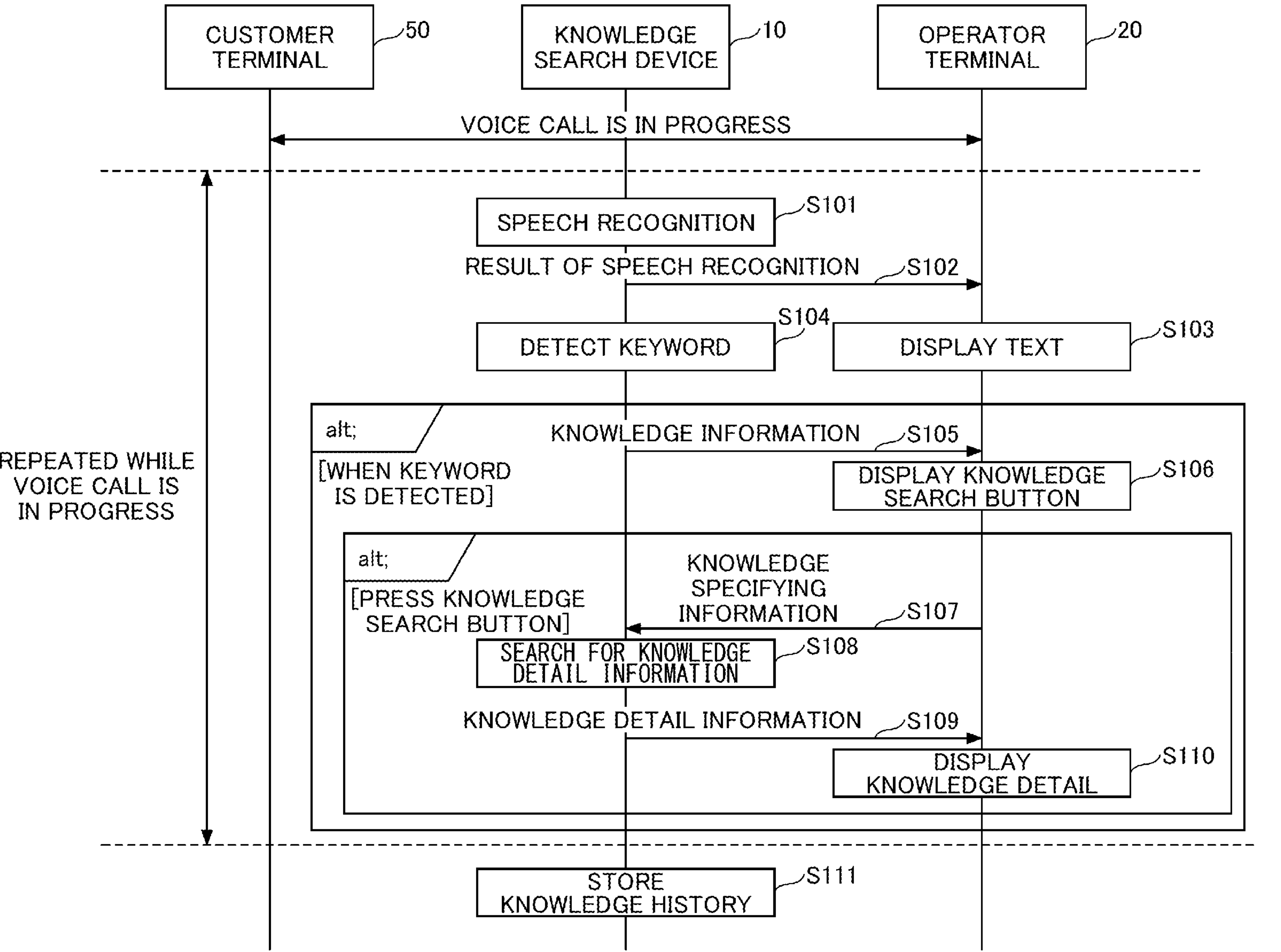
FIG. 4 is a sequence diagram that illustrates an example of a knowledge search process according to the embodiment.

An example of the knowledge search process according to the present embodiment will be described with reference to FIG. 4. The following description assumes that a voice call is in progress between a certain operator terminal 20 and a certain customer terminal 50. During this time, an operator screen 1000 such as that shown in FIG. 5 is displayed on the display of the operator terminal 20. This operator screen 1000 includes a talk content display part 1100 that displays the content of talk between the operator and the customer in text, a knowledge display part 1200 that displays knowledge detail information, and a knowledge search button display part 1300 that displays knowledge search buttons. The operator screen 1000 also includes a search part 1400 for specifying a search keyword when the operator searches for knowledge detail information manually, and a search button 1500 for starting a search.

Here, the following steps S101 to S110 are repeated during a voice call between the operator terminal 20 and the customer terminal 50.

The speech recognition text conversion part 101 converts a voice call between the operator terminal 20 and the customer terminal 50 into text, for each speaker (that is, both the operator and the customer), based on speech recognition (step S101). Next, the speech recognition text conversion part 101 sends the text obtained in step S101 to the operator terminal 20 (step S102). The text is then displayed on the operator screen 1000 of the operator terminal 20 (step S103). For example, when text 1101 to text 1105 are already displayed on the talk content display part 1100 of the operator screen 1000 shown in FIG. 5 and the text "Mr. Taro Yamada. What is your contract number?" is sent to the operator terminal 20, new text 1106 is displayed in the talk content display part 1100. In this way, the talk content display part 1100 dynamically displays the talk between the operator and the customer in text. Note that, in the example shown in FIG. 5, the text 1101, text 1103, text 1104, and text 1106 are the content of the operator's talk, and the text 1102 and text 1105 are the content of the customer's talk.

Next, the knowledge detection part 102 looks up the knowledge DB 107 and detects a keyword from the text obtained in step S101 (step S104). That is, the knowledge detection part 102 determines, for example, whether the text of the speaker set in the talk condition column in each record in the knowledge DB 107 shown in FIG. 3 contains the keyword corresponding to the talk condition. If the keyword is contained in the speaker's text, this keyword is detected. Note that multiple keywords may be detected in this step. In that case, a number of pieces of knowledge information may be sent to the operator terminal 20 in the next step S105.

If a keyword is detected in step S104, the knowledge information transmission part 103 sends knowledge information containing the keyword, to the operator terminal 20 (step S105). By this means, a knowledge search button that corresponds to the knowledge information is displayed on the operator screen 1000 of the operator terminal 20 (step S106). For example, if, as shown in FIG. 5, knowledge search buttons 1310 to 1320 are already displayed in the knowledge search button display part 1300 of the operator screen 1000 and knowledge information that contains the keyword "contract" is sent to the operator terminal 20, a new knowledge search button 1330 is displayed. In this way, the knowledge search button display part 1300 displays knowledge search buttons that correspond to the keywords detected in step S104. Note that, in the example shown in FIG. 5, in the knowledge search button display part 1300, knowledge search buttons corresponding to the keywords detected in step S104 are displayed from right to left, in the order in which the keywords were detected.

The operator presses the knowledge search buttons 1310 to 1330 displayed in the knowledge search button display part 1300, so that the operator can search for knowledge detail information in the knowledge DB 107 by using the keywords corresponding to the pressed buttons, and display the knowledge detail information, obtained as search results, in the knowledge display part 1200. Note that each knowledge search button may have a different color or shape depending on, for example, the category to which the corresponding keyword belongs (possible categories including, for example, product information, contract procedures, defects, etc.).

When one knowledge search button is pressed by the operator, information (hereinafter also referred to as "knowledge specifying information") including the keyword corresponding to that knowledge search button, is sent from the operator terminal 20 to the knowledge search device 10 (step S107). Upon receiving the knowledge specifying information, the knowledge search part 104 searches the knowledge DB 107 for knowledge detail information that matches the keyword included in this knowledge specifying information (step S108). That is, the knowledge search part 104 uses the keyword as a search keyword and searches the knowledge DB 107 for corresponding knowledge detail information. Note that, if there are multiple pieces of knowledge detail information that match the keyword, the operator searches for these pieces of knowledge detail information. In particular, when a keyword is defined in the knowledge DB 107 by using its proper expression, multiple pieces of knowledge detail information might match the keyword included in the knowledge specifying information.

Next, the knowledge detail information transmission part 105 transmits the knowledge detail information obtained in step S108, to the operator terminal 20 (step S109). By this means, the knowledge detail information is displayed on the operator screen 1000 of the operator terminal 20 (step S110). For example, in the knowledge display part 1200 of the operator screen 1000 shown in FIG. 5, knowledge detail information 1201 and 1202 are displayed. By pressing on the knowledge detail information 1201 and 1202 displayed in the knowledge display part 1200 (in other words, links to contents that represent knowledge, according to the present embodiment), the operator can display their corresponding knowledge on the knowledge display part 1200. Therefore, the operator can look at the knowledge displayed in the knowledge display part 1200 and give an appropriate answer to the inquiry from the customer.

Finally, when the voice call ends, the history analysis part 106 stores knowledge history information in the knowledge history DB 108 (step S111). In the knowledge history information, the call ID of the voice call, the operator ID that identifies the operator in the voice call, the customer ID of the customer in the voice call, the keywords detected by the knowledge detection part 102 during the call, the number of times each keyword was detected, and the number of times each keyword was used for a search, are associated with each other.

As described above, according to the contact center system 1 of the present embodiment, a talk that is held between an operator and a customer is converted into text, dynamically, by using speech recognition, and, if this text contains predetermined keywords, display components (knowledge search buttons) for searching for knowledge based on each keyword are dynamically displayed on the operator's screen (in other words, the display components are dynamically presented to the operator). By this means, the operator can display only the knowledge that he/she needs, with ease, by pressing desired knowledge search buttons among the knowledge search buttons displayed on the operator screen.

Therefore, it is possible to present only appropriate knowledge to the operator, without presenting unnecessary knowledge to the operator or having a conflict with the operator's manual knowledge search. Furthermore, compared to the case in which knowledge is automatically searched for as in existing art, it is also possible to reduce the processing load on the knowledge search device 10.

Note that, according to the contact center system 1 of the present embodiment, for example, an operator can enter a desired keyword in the search part 1400 on the operator screen 1000 and press the search button 1500, thereby searching for knowledge detail information that matches this keyword (that is, the operator can do a manual knowledge search). In this case, in response to the press on the search button 1500, knowledge specifying information including the keyword is sent from the operator terminal 20 to the knowledge search device 10, and a search for knowledge detail information is conducted in the same manner as in step S106.

<Knowledge History Search Process>

Figures 6, 7:
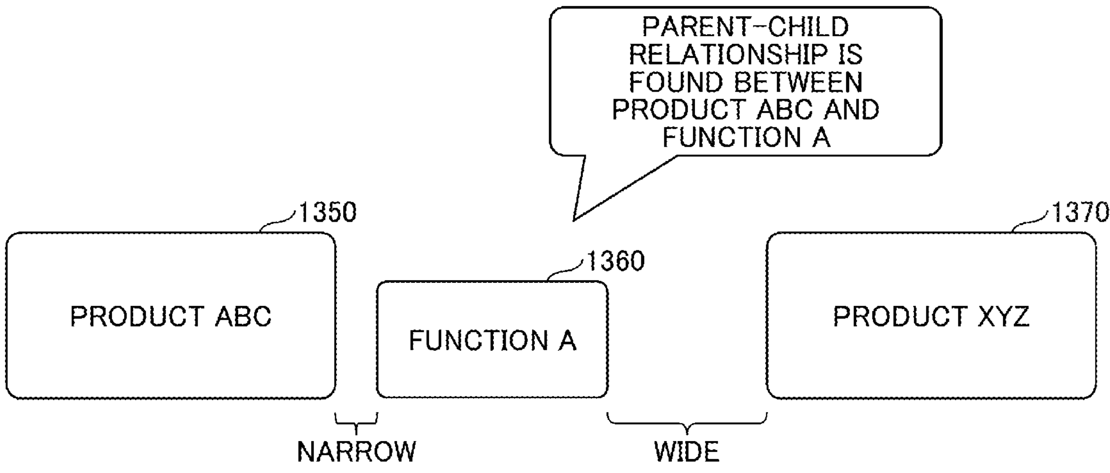
FIG. 6 is a flowchart that illustrates an example of a knowledge history search process according to the embodiment.
FIG. 7 is a diagram for explaining an example layout of knowledge search buttons.

An example of the knowledge history search process according to the present embodiment will be described with reference to FIG. 6.

First, the history analysis part 106 receives an analysis request from the manager terminal 30 (step S201). The analysis request includes analysis conditions regarding what analysis is to performed. This analysis request is sent to the knowledge search device 10 according to the manager's operation on the manager terminal 30.

Next, upon receiving the analysis request sent from the manager terminal 30 in step S201, the history analysis part 106 analyzes the knowledge history information stored in the knowledge history DB 108, in accordance with this analysis request (step S202). The knowledge history information stored in the knowledge history DB 108 can be analyzed in a variety of ways, depending on the purpose. For example, assuming that telephone calls take place during a certain period of time, it is possible to total the number of detections or total the number of searches per operator ID or per customer ID. Alternatively, given telephone calls during a certain period of time, for example, it is possible to calculate how many times on average each operator searches for or detects each keyword (or how many times on average a certain keyword is detected or used for a search in one telephone call), and extract keywords having a calculation result that is greater than or equal to (or less than) a predetermined threshold. Similarly, for example, it is possible to calculate the frequency with which each keyword is detected or used for a search during calls in a certain period of time, and extract keywords that are detected or used for a search as frequently as or more frequently than a predetermined threshold (or less frequently than the threshold). However, these are simply examples, and any analysis other than these, such as ones for calculating various index values, is possible.

Then, the history analysis part 106 sends (returns) the analysis result in step S202 to the manager terminal 30 (step S203). By this means, the analysis results are displayed on the display of the manager terminal 30.

As described above, according to the contact center system 1 of the present embodiment, a manager such as a supervisor (including people in charge of making knowledge such as FAQs) can obtain the results of various analyses of knowledge history information. Therefore, for example, the manager can use the results of these analyses to improve knowledge or to train the operators.

To be more specific, for example, if the average number of times a certain keyword is detected is high among the operators and yet the average number of times this keyword is used for a search is low among the operators, it is likely that the keyword is not appropriate, or that the knowledge detail information that corresponds to that keyword is not useful. Therefore, in this case, the manager can improve the keyword and knowledge detail information.

Furthermore, for example, if the average number of times a certain keyword is detected among the operators and the average number of times the keyword is used for a search are equal or close, it is likely that that keyword is appropriate and the knowledge detail information is useful, and yet many operators lack knowledge about this knowledge detail information. In this case, the manager can take measures such as training the operators.

<Variations>

Variations of the present embodiment will be described below.

<<Variation 1>>

For example, assuming that a certain keyword and another keyword have a parent-child relationship that can be expressed by a graph model or a layers model, if these keywords are detected in the same call, knowledge search buttons that correspond to these keywords may be displayed in association with one another. That is, for example, if there is a parent-child relationship between the keywords "product ABC" and "function A," as shown in FIG. 7, the width between the knowledge search button 1350 associated with "product ABC" and the knowledge search button 1360 associated with "function A" is narrowed, and the knowledge search button 1360 is displayed smaller than the knowledge search button 1350. On the other hand, if there is no such parent-child relationship, as is the case with the knowledge search button 1360 and knowledge search button 1370, the width between them is widened and displayed accordingly.

This makes it possible to understand the structural relationship between keywords from the layout of knowledge search buttons corresponding to the keywords, and allows the operator to display only items of knowledge that are related with each other.

<<Variation 2>>

Although a case has been described with the above embodiment in which knowledge search buttons are displayed in the knowledge search button display part 1300, from right to left, in the order the corresponding keywords are detected, the order of display may be changed as appropriate. For example, if a keyword that has been detected in the past is detected again, the knowledge search button corresponding to that keyword may be moved to the far left (that is, to the top), may be moved to the left by a predetermined number of buttons, or may be moved to the left by a number of buttons proportional to the number of times the keyword has been detected. Also, the flow of a conversation held between the operator and the customer may be specified from the text of speech recognition results, and, for example, a keyword that is strongly related to that context may be moved to the top, or moved to the left by a predetermined number of buttons. Note that existing natural language processing technologies may be used to calculate the relationship between context and keywords (words).

<<Variation 3>>

The present embodiment does not mention when the knowledge search buttons are deleted from the knowledge search button display part 1300. However, the knowledge search buttons may be deleted from the knowledge search button display part 1300 at some timing. For example, when a knowledge search button is pressed by the operator, the knowledge search button may be deleted. If a knowledge search button is not pressed for a certain period of time, the knowledge search button may be deleted. All the knowledge search buttons displayed at present may be deleted at a timing at which the call reason, which has been described earlier, changes.

<<Variation 4>>

A knowledge search button may not only show the keyword corresponding to the button, but may also show, for example, the number of times the knowledge search button has been pressed (that is, the number of searches). The number of searches displayed on the knowledge search button then may be the number of searches during the current call, the number of searches during all calls within a certain period of time, or may be the number of searches made by a certain operator or by all operators in a certain period of time. This makes it possible, for example, to press a knowledge search button showing a large number of searches, and display useful knowledge detail information.

<<Variation 5>>

The frequency with which each keyword is used for a search (for example, how often each keyword is used for a search in a certain period of time) may be calculated in advance, per operator. If a keyword is used for a search as frequently as or more frequently than a predetermined threshold, an automatic search may be started based on this keyword, without displaying a knowledge search button corresponding to the keyword. This is because, for a keyword with which a search is frequently made, there is a high probability that a search is going to be made based on that keyword.

<<Variation 6>>

Keywords with which an automatic search is made in units such as operators or their groups, and keywords that are displayed as knowledge search buttons may be set. By this means, if a keyword that is subject to automatic search is detected, an automatic search based on that keyword can be performed without displaying a knowledge search button corresponding to the keyword. By this means, for example, arrangements may be made for inexperienced operators such that the number of keywords subject to automatic search is increased for them, thereby effectively assisting the operators.

The present invention is by no means limited to the embodiment described in detail herein, and a variety of alterations and changes, and combinations with existing techniques, and so forth are possible without departing from the scope of the claims attached herewith.

REFERENCE SIGNS LIST

- 1 contact center system
- 10 knowledge search device
- 20 operator terminal
- 30 manager terminal
- 40 PBX
- 50 customer terminal
- 60 communication network
- 101 speech recognition text conversion part
- 102 knowledge detection part
- 103 knowledge information transmission part
- 104 knowledge search part
- 105 knowledge detail information transmission part
- 106 history analysis part
- 107 knowledge DB
- 108 knowledge history DB

The invention claimed is:

1. An information processing device comprising:

a processor; and a memory having instructions stored therein that, when executed by the processor, cause the processor to:

detect a character sequence from text, wherein the text represents content of talk by a plurality of parties, and the plurality of parties comprises a first speaker and a second speaker of a conversation;

create, based on the detected character sequence, an interactive search part for display to the second speaker of the conversation;

display, based on the detected character sequence, the interactive search part as an interactive display component to the second speaker, wherein the interactive search part indicates at least a part of the detected character sequence in interactively enterable form, the interactive search part is dynamically placed at least in part according to a sequence of character sequences as detected from the text, and the interactive search part is interactively selectable by the second speaker; and execute, in response to a selection of the interactive search part by the second speaker and based on a query including the at least part of the detected character sequence, a search operation to generate answer information as a result of the search operation, wherein the answer information addresses an inquiry from the first speaker.

2. The information processing device according to claim 1, wherein the search operation further comprises searching for, in response to interactively receiving the selection of the interactive display component by the second speaker, a knowledge in a database by using the character sequence corresponding to the interactive display component as a search keyword, and wherein the instructions, when executed by the processor, further cause the processor to present the knowledge as the answer information to the second speaker.

3. The information processing device according to claim 1, wherein the instructions, when executed by the processor, further cause the processor to present interactive display components to the second speaker in a sequence of detecting respective character sequences, wherein each of the interactive display components is operable to cause searching for a knowledge by using one of the respective character sequences as a search keyword.

4. The information processing device according to claim 3, wherein the instructions, when executed by the processor, further cause the processor to present, interactive display components when a first character sequence that is identical to a second character sequence that has been detected in past is detected, wherein each of the interactive display components is operable to cause the knowledge to be searched for by using the first character sequence as the search keyword is positioned at a top in an order of the interactive display components presented, or positioned a predetermined number of interactive display components higher in the order of the interactive display components presented.

5. The information processing device according to claim 1, wherein the instructions, when executed by the processor, further cause the processor to specify context of the content of talk, and present interactive display components to the second speaker in an order of strength of relationship that character sequences hold to the specified context.

6. The information processing device according to claim 1, wherein the display operation further comprises displaying the interactive display component to the second speaker by changing color or shape, or by changing both color and shape, of the interactive display component depending on what category a character sequence belongs to.

7. The information processing device according to claim 1, wherein the display operation further comprises displaying the interactive display component to the second speaker by associating the interactive display component with character sequences based on a graph model or a layers model.

8. The information processing device according to claim 1, wherein the interactive display component comprises an enterable search part and an interactive search button.

9. The information processing device according to claim 1, wherein the interactive display component comprises a knowledge search button, and the knowledge search button comprises a keyword according to at least a part of the detected character string.

10. A computer-implemented information processing method comprising:

detecting a character sequence from text, wherein the text represents content of talk by a plurality of parties, and the plurality of parties comprises a first speaker and a second speaker of a conversation;

creating, based on the detected character sequence, an interactive search part for display to the second speaker of the conversation;

displaying, based on the detected character sequence, the interactive search part as an interactive display component to the second speaker, wherein the interactive search part indicates at least a part of the detected character sequence in interactively enterable form, the interactive search part is dynamically placed at least in part according to a sequence of character sequences as detected from the text, and the interactive search part is interactively selectable by the second speaker; and executing, in response to a selection of the interactive search part by the second speaker and based on a query including the at least part of the detected character sequence, a search operation to generate answer information as a result of the search operation, wherein the answer information addresses an inquiry from the first speaker.

11. A non-transitory recording medium storing a program therein that, when executed on a computer, causes the computer to perform the method of claim 10.

12. The computer-implemented information processing method according to claim 10, wherein the interactive display component comprises an enterable search part and an interactive search button.

13. The computer-implemented information processing method according to claim 10, wherein the interactive display component comprises a knowledge search button, and the knowledge search button comprises a keyword according to at least a part of the detected character string.

* * * * *